United States Patent
Chen et al.

(10) Patent No.: US 12,444,947 B2
(45) Date of Patent: Oct. 14, 2025

(54) BATTERY STORAGE FORMULATION AND IMPACT ON DAY AHEAD SECURITY CONSTRAINED UNIT COMMITMENT

(71) Applicant: Midcontinent Independent System Operator, Inc., Carmel, IN (US)

(72) Inventors: Yonghong Chen, Zionsville, IN (US); Ross Baldick, Austin, TX (US)

(73) Assignee: MIDCONTINENT INDEPENDENT SYSTEM OPERATOR, INC., Carmel, IN (US)

(*) Notice: Subject to any disclaimer, the term of this patent is extended or adjusted under 35 U.S.C. 154(b) by 464 days.

(21) Appl. No.: 17/859,923

(22) Filed: Jul. 7, 2022

(65) Prior Publication Data
US 2023/0026455 A1    Jan. 26, 2023

Related U.S. Application Data

(60) Provisional application No. 63/219,201, filed on Jul. 7, 2021.

(51) Int. Cl.
*H02J 13/00* (2006.01)
*H02J 3/32* (2006.01)

(52) U.S. Cl.
CPC .......... *H02J 3/32* (2013.01); *H02J 13/00002* (2020.01); *H02J 2203/20* (2020.01)

(58) Field of Classification Search
CPC ................................................ H02J 13/00002
See application file for complete search history.

(56) References Cited

U.S. PATENT DOCUMENTS

2018/0191161 A1* 7/2018 An .......................... G06Q 50/06
2018/0314220 A1* 11/2018 Kumar ................. G05B 19/042
(Continued)

FOREIGN PATENT DOCUMENTS

CN       104822162 A  *  8/2015
GB         2586654 A  *  3/2021  ........... G01R 31/392

OTHER PUBLICATIONS

Padmanabhan et al, Battery Energy Storage Systems in Energy and Reserve Markets, Jan. 2020, IEEE, pp. 12 (Year: 2020).*

(Continued)

*Primary Examiner* — Suresh Suryawanshi
(74) *Attorney, Agent, or Firm* — BakerHostetler

(57) ABSTRACT

A method, system and computer-readable medium of directed towards improving battery storage is provided. In some embodiments, battery storage formulations are provided and an impact of the constraints on the computational performance of security constrained unit commitment (SCUC) is determined. For example, binary variables may be generally required due to mutual exclusiveness of charging and discharging modes. In some embodiments, valid inequalities may be used to improve state of charge (SOC) constraints. Adding batteries to the Regional Transmission Organizations (RTOs)/Independent System Operators (ISOs) day ahead market clearing cases may reveal an impact of binary variables and the valid inequalities on SCUC solving time. Warm start and lazy constraint techniques may be applied to improve the performance and make the valid inequalities more effective, reducing computation time to acceptable levels for implementation.

14 Claims, 6 Drawing Sheets

(56) References Cited

U.S. PATENT DOCUMENTS

| | | | |
|---|---|---|---|
| 2019/0206000 A1* | 7/2019 | ElBsat | H02J 3/381 |
| 2020/0258169 A1* | 8/2020 | Chen | G06Q 10/04 |
| 2022/0284458 A1* | 9/2022 | Sun | G06Q 30/0206 |

OTHER PUBLICATIONS

Herrero et al, Evolving Bidding Formats and Pricing Schemes in USA and Europe Day-Ahead Electricity Markets, Sep. 24, 2020, pp. 21 (Year: 2020).*

FERC Order 841; "Electric Storage Participation in Markets Operated by Regional Transmission Organizations and Independent System Operators"; United States of America Federal Energy Regulatory Commission; Errant Notice; Feb. 2018; 258 pages.

Gramlich et al.; "Enabling Versatility: Allowing Hybrid Resources to Deliver Their Full Value to Customers"; Grid Strategies LLC; Energy Storage Association Report; Sep. 2019; 29 pages.

Huang et al.; "A Configuration Based Pumped Storage Hydro Model in the MISO Day-Ahead Market"; IEEE Transactions on Power Systems; vol. 37; 2020; 8 pages.

Baldick et al.; "Optimization formulations for storage devices"; Operations Research; Optimization-online.org; 2021; 59 pages.

Li et al.; "Sufficient Conditions for Exact Relaxation of Complementarity Constraints for Storage-Concerned Economic Dispatch"; IEEE Transactions on Power Systems; vol. 31 No. 2; Mar. 2016; p. 1653-1654.

Li et al.; "Further Discussions on Sufficient Conditions for Exact Relaxation of Complementarity Constraints for Storage-Concerned Economic Dispatch"; Systems and Control; arXiv:1505.02493; 2015; 6 pages.

Chen et al.; "Improving Large Scale Day-Ahead Security Constrained Unit Commitment Performance"; IEEE Transactions on Power Systems; vol. 31 No. 6; Nov. 2016; p. 4732-4743.

Chen et al.; "A High Performance Computing Based Market Economics Driven Neighborhood Search and Polishing Algorithm for Security Constrained Unit Commitment"; IEEE Transactions on Power Systems; vol. 36 No. 1; Jan. 2021; p. 292-302.

"Lazy"; https://www.gurobi.com/documentation/9.1/refman/lazy.html; Gurobi Optimization; accessed Oct. 7, 2022; 5 pages.

Giacomoni et al.; "Optimizing Hydroelectric Pumped Storage PJM's Day-Ahead Energy Market"; FERC Technical Conf.; PJM; Jun. 2020; 26 pages.

Ruzic et al.; "A flexible approach to short-term hydro-thermal coordination. I. Problem formulation and general solution procedure"; IEEE Transactions on Power Systems; vol. 11 No. 3; Aug. 1996; p. 1564-1571.

Ruzic et. al.; "A flexible approach to short-term hydro-thermal coordination. II. Dual problem solution procedure"; IEEE Transactions on Power Systems; vol. 11 No. 3; Aug. 1996; p. 1572-1578.

Castronouvo et al.; "Optimal operation and hydro storage sizing of a wind-hydro power plant"; Electrical Power & Energy Systems; vol. 26; 2004; p. 771-778.

Brown et al.; "Optimization of Pumped Storage Capacity in an Isolated Power System with Large Renewable Penetration"; IEEE Transactions on Power Systems; vol. 23; May 2008; p. 523-531.

* cited by examiner

BATTERY STORAGE FORMULATION AND IMPACT ON DAY AHEAD SECURITY CONSTRAINED UNIT COMMITMENT

CROSS REFERENCE TO RELATED APPLICATIONS

The current application claims priority to U.S. provisional application Ser. No. 63/219,201, filed Jul. 7, 2021, the entire disclosure of which is incorporated herein by reference.

TECHNICAL FIELD

The present disclosure relates generally to systems and methods for energy storage and more particularly to systems and methods for battery storage.

SUMMARY

In some embodiments, battery storage formulations are provided and an impact of the constraints on the computational performance of security constrained unit commitment (SCUC) is determined. For example, binary variables may be generally required due to mutual exclusiveness of charging and discharging modes.

In some embodiments, valid inequalities may be used to improve state of charge (SOC) constraints. Adding batteries to the Regional Transmission Organizations (RTOs)/Independent System Operators (ISOs) day ahead market clearing cases may reveal an impact of binary variables and the valid inequalities on SCUC solving time. Warm start and lazy constraint techniques may be applied to improve the performance and make the valid inequalities more effective, reducing computation time to acceptable levels for implementation.

In accordance with some examples, a computer readable storage medium has stored therein instructions that are computer executable to perform or cause performance of any of the methods described herein. In accordance with some examples, an integrator device includes one or more processors, a memory, and one or more programs; the one or more programs are stored in the memory and configured to be executed by the one or more processors and the one or more programs include instructions for performing or causing performance of any of the methods described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, it is not necessary that the claimed subject matter address any or all of the stated objects or advantages provided herein as there may exist additional advantages of the disclosed technology that are inherent and not expressly disclosed.

BRIEF DESCRIPTION OF THE DRAWINGS

Reference will now be made to the accompanying drawings, which are not necessarily drawn to scale.

Figure 1:
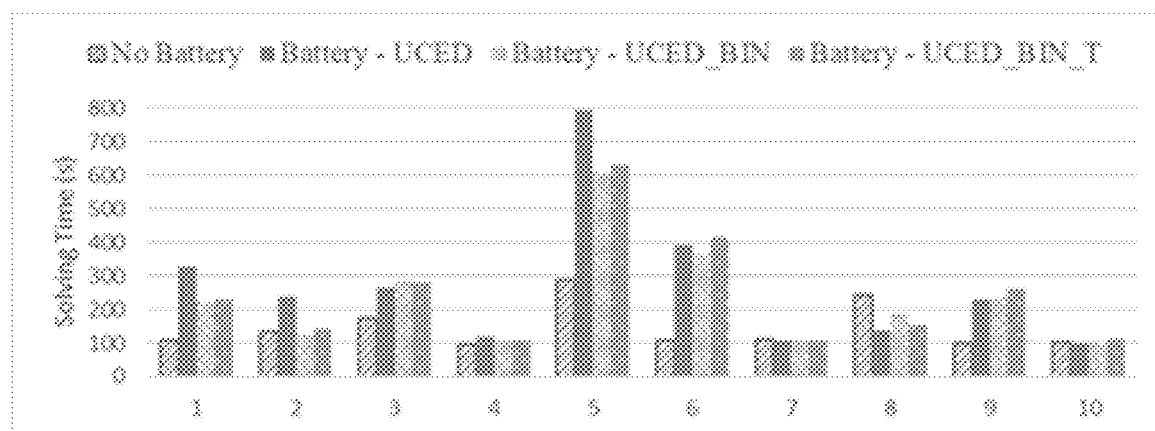
FIG. 1 illustrates an exemplary comparison of Mixed-Integer Programming (MIP) solving time under different battery storage models, among other things.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

BACKGROUND

According to some embodiments, one or more of the following references may set forth background to the present application, the entire disclosure of which are incorporated herein by reference:

[1] FERC Order 841 "Electric Storage Participation in Markets Operated by Regional Transmission Organizations and Independent System Operators", Feb. 15, 2018.

[2] Energy Storage Association Report, "Enabling Versatility: Allowing Hybrid Resources to Deliver Their Full Value to Customers", Sep. 19, 2019.

[3] B. Huang, Y. Chen, R. Baldick, "A Configuration Based Pumped Storage Hydro Model in MISO Day-Ahead Market", working paper, available online: https://arxiv.org/abs/2009.04944.

[4] R. Baldick, Y. Chen, B. Huang, "Optimization formulations for storage devices", under review

[5] Z. Li, Q. Guo, H. Sun and J. Wang, "Sufficient Conditions for Exact Relaxation of Complementarity Constraints for Storage-Concerned Economic Dispatch," in *IEEE Transactions on Power Systems*, vol. 31, no. 2, pp. 1653-1654, March 2016

[6] Z. Li, Q. Guo, H. Sun and J. Wang, "Further Discussions on Sufficient Conditions for Exact Relaxation of Complementarity Constraints for Storage-Concerned Economic Dispatch", available online: https://arxiv.org/abs/1505.02493.

[7] Y. Chen, A. Casto, F. Wang, Q. Wang, X. Wang, and J. Wan, "Improving large scale day-ahead security constrained unit commitment performance," *IEEE Trans. Power Syst.*, vol. 31, no. 6, pp. 4732-4743, November 2016.

[8] Y. Chen, F. Pan, J. Holzer, E. Rothberg, Y. Ma, and A. Veeramany. A high performance computing based market economics driven neighborhood search and polishing algorithm for security constrained unit commitment. IEEE Transactions on Power Systems, vol. 36, no. 1, pp. 292-302, January 2021.

[9] https://www.gurobi.com/documentation/9.1/refman/lazy.html

[10] A. Giacomoni, Q. Gu, B. Gisin, Optimizing hydroelectric pumped storage in PJM's day-ahead energy market, FERC Technical Conference, June, 2020. Available online: https://www.ferc.gov/sites/default/files/2020-06/T2-3_Giacomoni_et_al.pdf.

[11] Slobodan Ruzic, Nikola Rajakovic, and Aca Vuckovic. A flexible approach to short-term hydro-thermal coordination, part i: Problem formulation and general solution procedure. IEEE Transactions on Power Systems, 11(3): 1564-1571, August 1996.

[12] Slobodan Ruzic, Aca Vuckovic, and Nikola Rajakovic. A flexible approach to short-term hydro-thermal coordination, part ii: Dual problem solution procedure. IEEE Transactions on Power Systems, 11(3):1572-1578, August 1996.

[13] E. D. Castronuovo and J. A. P. Lopes, "Optimal operation and hydro storage sizing of a wind-hydro power plant," International Journal of Electrical Power & Energy Systems, vol. 26, no. 10, pp. 771-778, 2004.

[14] P. D. Brown, J. P. Lopes, and M. A. Matos, "Optimization of pumped storage capacity in an isolated power system with large renewable penetration," IEEE Transactions on Power systems, vol. 23, no. 2, pp. 523-531, 2008.

DETAILED DESCRIPTION

Storage of generated energy has existed as a contributing resource within the power sector, e.g., for over a century in the case of pumped hydro storage. The deployment of chemical battery storage, with different operating characteristics to pumped hydro storage, is increasing within the industry. For example, the Federal Energy Regulatory Commission (FERC) issued Order 841 [1] in 2018 requiring each Regional Transmission Organization (RTO) and Independent System Operator (ISO) to establish a wholesale market participation model for electric storage resources that recognizes their unique physical and operational characteristics and removes any barrier to their participation. The order does not specifically require RTOs/ISOs to optimize the state of the charge (SOC). Recently, storage-plus-generation co-located hybrid resources have also been increasing as a share of new proposed projects and participants are seeking self-optimizing opportunities.

According to some embodiments, some RTOs/ISOs may optimize pumped storage hydro in a day ahead market. For example, although most RTOs/ISOs may not currently optimize SOC for battery storage, the SOC may be an essential aspect of the operating characteristics of storage. According to some embodiments, optimizing storage with explicit representation of SOC may positively impact computational performance and may provide an economic benefit. For example, a case study based on RTO/ISO day ahead security-constrained-unit-commitment (SCUC) problems may illustrate any number of these benefits. According to some embodiments, battery storage may be continuously dispatched across 0 MW (e.g., smoothly dispatched across charging and discharging modes). According to some embodiments, storage may be optimized with a discontinuous dispatch range, e.g., pumped storage hydro. According to some embodiments, given a trend of co-located hybrid resources, one battery may be added to each wind generator location in several RTO/ISO day ahead cases for a future scenario case study.

According to some embodiments, battery storage formulation may require complementarity constraints due to the mutually exclusive charging and discharging modes, necessitating either non-convex continuous constraints or binary variables. For example, the battery storage formulation can be relaxed to the convex form under sufficient conditions.

As another example, valid inequalities may be derived for pumped storage hydro (PSH) with two binary variables to represent mutual exclusivity amongst three PSH configurations (pumping, generating, and off), and represent SOC.

According to some embodiments, battery storage binary variables, valid inequality constraints, and explicit representation of battery SOC may impact the performance of day ahead SCUC. For example, embodiments may solve one of the largest and most complicated day ahead electricity market clearing problems. As another example, Midcontinent Independent System Operator (MISO) has been striving to improve the computational performance and develop market clearing systems to meet future market enhancement needs. For prototyping and benchmarking MISO production day ahead market clearing cases, MISO developed the "HIPPO" software and the battery storage formulations are prototyped and studied on HIPPO.

According to some embodiments, a more general form of the sufficient conditions for convex relaxation of the battery storage formulation is derived and the impact of binary variables on day ahead SCUC performance is evaluated on RTO/ISO day ahead cases.

According to some embodiments, a single binary variable battery storage formulation with the conventional state of charge (SOC) formulation (e.g., using an enhanced SOC formulation with tighter valid inequality constraints) is introduced and analyzed.

According to some embodiments, factors contributing to challenges with the battery storage model for the day ahead SCUC may be summarized (e.g., based on RTO/ISO case studies).

According to some embodiments, results from the novel approach of applying the enhanced SOC formulation with warm start and lazy constraint techniques may be utilized to speed up performance and make valid inequalities more effective.

Battery Storage Formulation

Battery Storage Formulation with Convex Relaxation and Properties

According to some embodiments, it may be assumed the battery storage is allowed to bid to buy energy at price $C_t^p$ for charging and to offer to sell energy at price $C_t^g$ for discharging for t=1, ..., T, with charging and discharging decisions also subject to SOC limits. Because of RTO/ISO rules on bids/offers being non-decreasing, it may be required that $C_t^p - C_t^g \leq 0$.

According to some embodiments, it may be assumed there are K other generators with cost of $C_k(g_{k,t})$ for k=1, ..., K and t=1, ..., T. A unit commitment and economic dispatch (UCED) model with battery storage and generators may be considered. $g_{k,t}$ may be defined to be the output of generator k at time t, $x_k$ and $y_k$ may be the set of continuous and binary variables associated with generator k, $C_k(x_k, y_k)$ may be associated with its cost function, and $F_k(x_k, y_k) \leq 0$ may be the constraints specifying its feasible operating region. It may be assumed that if the binary variables are fixed then these constraints are either linear in the continuous variables or, together with the other constraints in each formulation, satisfy a suitable constraint qualification so that strong duality holds.

According to some embodiments, $g_t$ may be defined to be the variable for battery discharging with maximum value $\bar{g}$ and define $p_t$ to be the variable for battery charging with maximum $\bar{p}$ for interval t. It may be assumed that battery initial SOC is $s_0$. According to some embodiments, $\beta > \alpha > 0$ may be the coefficients reflecting the effect of pumping and generation on SOC, with $\alpha/\beta < 1$ being the roundtrip efficiency for the battery. Finally, $\bar{s}$ and $\underline{s}$ may be the maximum and minimum SOC of the battery.

The UCED model with convex form for the battery storage may be as follows. To focus on the discussion of battery storage, it may be assumed the generator binary variables are fixed at pre-solved unit commitment values $y_k^0$. Also, it may be assumed that $C_k(x_k, y_k^0)$ is convex. With those assumptions, the "convex form" of the battery storage may be formulated as a convex problem as follows (with dual variables in parentheses):

$$UCED = \text{Min} \sum_{t=1}^{T} [-C_t^p p_t + C_t^g g_t] + C_k(x_k, y_k^0) \quad (1)$$

$$\text{s.t. } F_k(x_k, y_k^0) \leq 0 \,\forall\, k = 1, \ldots, K \quad (2)$$

$$-\sum_{k=1}^{K} g_{k,t} - g_t + p_t = -D_t(\lambda_t) \quad (2)$$

$$-g_t \leq 0(\delta_t') \quad (3)$$

$$g_t - \bar{g} \leq 0(\delta_t'') \quad (4)$$

$$-p_t \leq 0(\gamma_t') \quad (5)$$

$$p_t - \bar{p} \leq 0(\gamma_t'') \quad (6)$$

$$s_0 + \sum_{\tau=1}^{t} (\alpha \cdot p_\tau - \beta \cdot g_\tau) \leq \bar{s}(\sigma_t') \quad (7)$$

$$-s_0 - \sum_{\tau=1}^{t} (\alpha \cdot p_\tau - \beta \cdot g_\tau) \leq -\underline{s}(\sigma_t'') \quad (8)$$

$$\forall\, t = 1, \ldots, T$$

In this UCED formulation with battery storage, the objective is to minimize production cost, (1) are the operating constraints for generators with fixed binary variables, (2) is power balance constraint with $D_t$ as the fixed demand at interval t, (3)-(6) are the limit constraints for battery discharging and charging, and (7) and (8) are SOC constraints. For the purposes of discussing the implications of the battery formulation, transmission constraints may be ignored, so all battery capacity is assumed to be aggregated into a single equivalent battery. According to some embodiments, transmission constraints may be included in RTO/ISO case studies.

Theorem 1. The necessary condition to clear a battery with simultaneous charging and discharging MW under the convex form is to have the energy clearing price $\lambda_{t1}$ for some interval t1 be less than or equal to $$\frac{\beta C_{t1}^p - \alpha C_{t1}^g}{(\beta - \alpha)}.$$

Proof: The dual of UCED related to battery primal and dual variables is as follows:

$$DUUCED = \text{Max} \sum_{t=1}^{T} [D_t \lambda_t - \bar{s}\sigma_t' + \underline{s}\sigma_t'' - \delta_t'' \bar{g} - \gamma_t'' \bar{p}]$$

s.t.

$$-\lambda_t - \delta_t' + \delta_t'' + \beta \sum_{\tau=t}^{T} (\sigma_\tau'' - \sigma_\tau') \geq -C_t^g(g_t) \quad (9)$$

$$\lambda_t - \gamma_t' + \gamma_t'' - \alpha \sum_{\tau=t}^{T} (\sigma_\tau'' - \sigma_\tau') \geq C_t^p(p_t) \quad (10)$$

$$\delta_t', \delta_t'', \gamma_t', \gamma_t'', \sigma_t', \sigma_t'' \geq 0$$

$$\forall\, t = 1, \ldots, T$$

The condition for charging and discharging at the same time is to have an optimal solution with $g_{t1} > 0$ and $p_{t1} > 0$ for some specific interval $1 \leq t1 \leq T$. By complementary slackness, From (3), (5): $\delta'_{t1} = 0, \gamma'_{t1} = 0$ From (9): $-\lambda_{t1} + \delta''_{t1} + \beta \Sigma_{\tau=t1}^{T}(\sigma''_\tau - \sigma'_\tau) = -C_{t1}^g \quad (11)$ From (10): $\lambda_{t1} + \gamma''_{t1} - \alpha \Sigma_{\tau=t1}^{T}(\sigma''_\tau - \sigma'_\tau) = C_{t1}^p \quad (12)$ With $\alpha \cdot (11) + \beta \cdot (12)$ we have:

$$\lambda_{t1} = \frac{\beta C_{t1}^p - \alpha C_{t1}^g - \alpha \delta''_{t1} - \beta \gamma''_{t1}}{(\beta - \alpha)} \leq \frac{\beta C_{t1}^p - \alpha C_{t1}^g}{(\beta - \alpha)} \quad (13)$$

QED

It is observed that adding (11) and (12) yields:

$$\delta''_{t1} + \gamma''_{t1} + (\beta - \alpha)\Sigma_{\tau=t1}^{T}(\sigma''_\tau - \sigma'_\tau) = C_{t1}^p - C_{t1}^g \quad (14)$$

By assumption, $C_t^p - C_t^g \leq 0$ for a battery offered into the market. If $C_{t1}^p - C_{t1}^g < 0$, $\sigma'_\tau > 0$ (i.e., binding at maximum SOC) may be required for at least one of the intervals $\tau \geq t1$.

With transmission constraints and losses represented, a condition similar to (14) may be analogously derived by replacing $\lambda_{t1}$ with the battery locational marginal price at t1. To summarize, simultaneous clearing of charging and discharging MW may happen if the price is less than or equal to $$\frac{\beta C_{t1}^p - \alpha C_{t1}^g}{(\beta - \alpha)}.$$

Even for a special case with a single interval, i.e., T=1, the storage may simultaneously clear with $g_t > 0$ and $p_t > 0$ as will be shown in section IV.A for a single interval example.

Hence, a sufficient condition for using the convex relaxation formulation may be for the LMP to be higher than $$\frac{\beta C_{t1}^p - \alpha C_{t1}^g}{(\beta - \alpha)}.$$

For batteries bidding and offering to arbitrage energy across different intervals with $C_t^p = C_t^g = 0$, respectively, the sufficient condition is for the LMP to be positive (e.g., consistent with Lemma 1 in [4]). This condition may be satisfied most of the time; however, negative prices may increasingly occur with renewable integration and transmission congestion. Moreover, renewables and congestion may be important drivers of battery installation. That is, even if zero and negative prices are relatively rare, they may be expected to at least occasionally be present with storage and so this issue must be tackled, as discussed in the next section.

Battery Storage Formulation with Binary Variables

Adding one binary variable $u_t$ for each battery as in the following problem (UCED_BIN) can ensure mutual exclusivity of charging and discharging modes under any prices. According to some embodiments, a novel single binary variable formulation may be provided.

$$\text{UCED\_BIN} = \text{Min} \sum_{t=1}^{T} [-C_t^p p_t + C_t^g g_t] + C_k(x_k, y_k^0)$$

s.t. (1)(2)(3)(5)(7)(8)

$$g_t - \overline{g} u_t \leq 0 \tag{15. BIN}$$

$$p_t - \overline{p}(1 - u_t) \leq 0 \tag{16. BIN}$$

$$u_t \in \{0, 1\} \tag{17. BIN}$$

The model with $u_t$ relaxed to being a continuous variable is UCED_BIN_Rel:

$$\text{Min} \sum_{t=1}^{T} [-C_t^p p_t + C_t^g g_t] + C_k(x_k, y_k^0)$$

s.t. (1)(2)(3)(5)(7)(8)

$$g_t - \overline{g} u_t \leq 0 (\delta_t'') \tag{15}$$

$$p_t - \overline{p}(1 - u_t) \leq 0 (\gamma_t'') \tag{16}$$

$$-u_t \leq 0 (\rho_t') \tag{17}$$

$$u_t \leq 1 (\rho_t'') \tag{18}$$

$$\forall t = 1, \ldots, T$$

For the constraints associated with the individual battery: (3)(5)(7)(8) and (15)-(18), it may be observed that the relaxed feasible set with $u_t$ continuous does not form the convex hull of the feasible set of (UCED_BIN) even for a single interval case T=1.

For example, for T=1, assume $s_0=0$, $\underline{s}=0$, then there is a fractional solution $u_1 = \alpha \overline{p}/(\alpha \overline{p} + \beta \overline{g})$ corresponding to the following three linearly independent binding constraints: $g_1 = \overline{g} u_1$, $p_1 = \overline{p}(1-u_1)$, and $-s_0 - \alpha \cdot p_1 + \beta \cdot g_1 \leq -\underline{s}$. This example shows that an extreme point with fractional $u_t$ exists for this formulation. Hence, this set of constraints does not specify the convex hull for individual batteries even for T=1.

Next, the conditions under which $u_t$ can be fractional may be examined more generally.

Theorem 2. The necessary condition for the convex problem UCED_BIN_Rel to solve with fractional $u_t$ for a battery is to have its price less than or equal to $$\frac{\beta C_{t1}^p - \alpha C_{t1}^g}{(\beta - \alpha)}.$$

Proof: For the binary relaxation problem, the optimality conditions include:

$$-\delta_t' + \delta_t'' + \beta \sum_{\tau=t}^{T} (\sigma_\tau'' - \sigma_\tau') \geq -C_t^g + \lambda_t(g_t) \tag{19}$$

$$-\gamma_t' + \gamma_t'' - \alpha \sum_{\tau=t}^{T} (\sigma_\tau'' - \sigma_\tau') \geq C_t^p - \lambda_t(p_t) \tag{20}$$

$$-\overline{g} \delta_t'' + \overline{p} \gamma_t'' - \rho_t' + \rho_t'' \geq 0(u_t) \tag{21}$$

$$\delta_t', \delta_t'', \gamma_t', \gamma_t'', \sigma_t', \sigma_t'', \rho_t', \rho_t'' \geq 0$$

$$\forall t = 1, \ldots, T$$

Note that any solution of (UCED_BIN_Rel) satisfying $g_t=0$ and $0<u_t<1$ has an equivalent binary solution of $g_t=0$ and $u_t=0$. Similarly, any solution $p_t=0$ and $0<u_t<1$ has an equivalent binary solution of $p_t=0$ and $u_t=1$. In both cases, we could say that the solution of (UCED_BIN_Rel) has been "cured," since from the perspective of (UCED_BIN), an optimal solution exists with the same values of pumping and generation. Problem (UCED_BIN_Rel) has a fractional optimal solution that cannot be cured to a solution of (UCED_BIN) when $0<u_t<1$, $g_t>0$ and $p_t>0$.

Similar to Theorem 1, it may be proved that the necessary condition for $g_t>0$, $p_t>0$ and $0<u_t<1$ to happen is:

$$\lambda_t = \frac{\beta C_t^p - \alpha C_t^g - \alpha \delta_t'' - \beta \gamma_t''}{(\beta - \alpha)} \leq \frac{\beta C_t^p - \alpha C_t^g}{(\beta - \alpha)}$$

It is the same condition as (13). QED

Tightened Battery Storage Formulation and the Sufficient Condition for Convex Relaxation Tightened SOC Formulation The left-hand side of (7) and (8) is the SOC at interval t.

$$s_t = s_0 + \sum_{\tau=1}^{t} (\alpha \cdot p_\tau - \beta \cdot g_\tau) = s_{t-1} + \alpha \cdot p_t - \beta \cdot g_t$$

Conditions (7) and (8) are equivalent to $\underline{s} \leq s_t \leq \overline{s}$. As discussed in [4], with mutually exclusive charging and discharging, (7) and (8) can be tightened to:

$$s_{t-1} + \alpha \cdot p_t \leq \overline{s} \tag{22}$$

$$s_{t-1} - \beta \cdot g_t \geq \underline{s} \tag{23}$$

This formulation may be used for pumped storage hydro, but (22) and (23) may also be valid inequalities for any storage device with mutually exclusive modes. Moreover, (22) and (23) may be tighter than (7) and (8). According to some embodiments, the impact of (22) and (23) on battery storage may be examined.

Tightened Battery Storage Formulation with Convex Relaxation

The convex form of the UCED optimization model with the tightened battery storage SOC formulation may be represented as follows:

$$\text{UCED\_T} = \text{Min} \sum_{t=1}^{T} [-C_t^p p_t + C_t^g g_t] + \sum_{k=1}^{K} \sum_{t=1}^{T} C_k(g_{k,t})$$

s.t. (1)-(6), $$s_0 + \sum_{\tau=1}^{t-1} (\alpha \cdot p_\tau - \beta \cdot g_\tau) + \alpha \cdot p_t \leq \overline{s}(\sigma_t') \tag{24}$$

$$-s_0 - \sum_{\tau=1}^{t-1} (\alpha \cdot p_\tau - \beta \cdot g_\tau) + \beta \cdot g_t \leq -\underline{s}(\sigma_t'') \tag{25}$$

$$\forall t = 1, \ldots, T$$

Theorem 3. The convex formulation UCED_T guarantees mutual exclusivity for the last interval T. For t<T, the necessary condition to clear a battery with simultaneous charging and discharging MW under the convex formulation UCED_T is to have its price less than or equal to $$\frac{\beta C_{t1}^p - \alpha C_{t1}^g}{(\beta - \alpha)}.$$

Proof: The condition for charging and discharging at the same time is to have an optimal solution with $g_{t1}>0$ and $p_{t1}>0$ for a specific interval $1 \leq t1 \leq T$.

From complementary slackness: $\delta_{t1}'=0$, $\gamma_{t1}'=0$.

The optimality conditions are:

$$-\lambda_t - \delta'_t + \delta''_t + \beta\sigma''_t + \beta\sum_{\tau=t+1}^{T}(\sigma''_\tau - \sigma'_\tau) = C^g_t(g_t) \quad (26)$$

$$\lambda_t - \gamma'_t + \gamma''_t + \alpha\sigma'_t - \alpha\sum_{\tau=t+1}^{T}(\sigma''_\tau - \sigma'_\tau) = C^p_t(p_t) \quad (27)$$

$$\delta'_t, \delta''_t, \gamma'_t, \gamma''_t, \sigma'_t, \sigma''_t \geq 0$$

$$\forall t = 1, \ldots, T$$

Summing (26) and (27) yields:

$$\delta''_t + \beta\sigma''_t + \gamma''_t + \alpha\sigma'_t + (\beta-\alpha)\Sigma_{\tau=t+1}^{T}(\sigma''_\tau - \sigma'_\tau) = C^p_t - C^g_t \quad (28)$$

Evaluating $\alpha \cdot (26) + \beta \cdot (27)$ yields:

$$(\beta-\alpha)\lambda_t + \alpha\delta''_t + \beta\gamma''_t + \alpha\beta(\sigma''_t + \sigma'_t) = \beta C^p_t - \alpha C^g_t \quad (29)$$

By assumption, $C^p_t \leq C^g_t$. For the last interval t=T, we have from (28):

$$0 \leq \delta''_T + \beta\sigma''_T + \gamma''_T + \alpha\sigma'_T = C^p_T - C^g_T \leq 0 \quad (30)$$

This condition can only be true when $\lambda_T = C^p_T = C^g_T$ and $\delta''_T = \sigma''_T = \gamma''_T = \sigma'_T = 0$, which means that the battery constraints are not binding on any MW or MWh limit and the battery is setting the price. In this case, if $g_T \geq p_T > 0$, we have $s_{T-1} + \alpha \cdot p_T \leq \bar{s}$ and $-s_{T-1} + \beta \cdot g_T \leq -\underline{s}$ under the tightened SOC formulation.

Consider $g'_T = g_T - p_T$ and $p'_T = 0$.

$$s_{T-1} + \alpha \cdot p'_T \leq s_{T-1} + \alpha \cdot p_T \leq \bar{s}$$

$$-s_{T-1} + \beta \cdot g'_T \leq -s_{T-1} + \beta \cdot g_T \leq -\underline{s}$$

Hence $g'_T$ and $p'_T$ is also an optimal solution with the same objective.

Similarly, if $p_T \geq g_T > 0$, the solution $p'_T = p_T - g_T$ and $g'_T = 0$ is also an optimal solution with the same objective. Under all other conditions, (30) cannot be true. Hence, the last interval T always has an optimal solution that satisfies the exclusive charging and discharging condition.

Similar logic can be applied for time t1 if $\sigma'_\tau = 0$, which is satisfied if (24) are not binding for any intervals $\tau > t1$. Under this condition, mutually exclusive charging and discharging will be satisfied for t1.

However, if the SOC constraint (24) binds at an interval $t > t1$, then (28) may hold for $t < t1$ and so simultaneous clearing of $g_t > 0$ and $p_t > 0$ may happen. The necessary condition for simultaneous clearing of pumping and generation to happen is:

$$\lambda_t = \frac{\beta C^p_t - \alpha C^g_t - \alpha\delta''_t - \beta\gamma''_t - \alpha\beta(\sigma''_t + \sigma'_t)}{(\beta-\alpha)} \leq \frac{\beta C^p_t - \alpha C^g_t}{(\beta-\alpha)}$$

It is again the same condition as (13). QED

C. Tightened Battery Storage Formulation with Binary Variables

Adding one binary variable $u_t$ for each battery (UCED_BIN_T) to the tightened battery storage model can ensure mutual exclusivity of charging and discharging modes. The model with $u_t$ relaxed to a continuous variable is:

$$\text{UCED\_BIN\_T\_Rel} = \text{Min} \sum_{k=1}^{T}\left[-C^p_t p_t + C^g_t g_t\right] + C_k(x_k, y^0_k)$$

$$\text{s.t. } (1)(2)(3)(5), (15)\text{-}(18), (24)(25)$$

$$\forall t = 1, \ldots, T$$

Next, we examine the condition under which $u_t$ can be fractional.

Theorem 4. Under the formulation UCED_BIN_T_Rel, the last interval always has an optimal solution with $u_T$ binary. For $t < T$, the necessary condition for the convex problem UCED_BIN_T_Rel to solve with fractional $u_t$ for a battery is to have its price less than or equal to $$\frac{\beta C^p_{t1} - \alpha C^g_{t1}}{(\beta-\alpha)}.$$

Proof: Consider the profit maximization problem with $\lambda_t$ as the price for the battery at time t.

$$\text{Max} \sum_{k=1}^{T} \lambda_t(-p_t + g_t) + C^p_t p_t - C^g_t g_t$$

$$\text{s.t. } (3)(5), (15)\text{-}(18), (24)(25)$$

For the binary relaxation problem, the optimality conditions are:

$$-\delta'_t + \delta''_t + \beta\sigma''_t + \beta\sum_{\tau=t+1}^{T}(\sigma''_\tau - \sigma'_\tau) = -C^g_t + \lambda_t(g_t) \quad (31)$$

$$-\gamma'_t + \gamma''_t + \alpha\sigma'_t - \alpha\sum_{\tau=t+1}^{T}(\sigma''_\tau - \sigma'_\tau) \geq -C^p_t - \lambda_t(p_t) \quad (32)$$

$$-\bar{g}\delta''_t + \bar{p}\gamma''_t - \rho'_t + \rho''_t \geq 0(u_t) \quad (33)$$

$$\delta'_t, \delta''_t, \gamma'_t, \gamma''_t, \sigma'_t, \sigma''_t, \rho'_t, \rho''_t \geq 0$$

$$\forall t = 1, \ldots, T$$

For the problem to have fractional solution, i.e., $0 < u_t < 1$, $g_t > 0$ and $p_t > 0$, Similar to Theorem 3, we can derive that the last interval T always has an optimal solution that satisfies the mutually exclusive charging and discharging condition if $C^p_T \leq C^g_T$. Note, the solution $g_T = 0$ and $0 < u_T < 1$ can be cured to have an equivalent binary solution of $g_T = 0$ and $u_T = 0$. Similarly, $p_T = 0$ and $0 < u_T < 1$ has an equivalent binary solution of $p_T = 0$ and $u_T = 1$. Hence, the last interval always has an optimal solution with $u_T$ binary. To summarize, for the special case T=1, this tightened SOC formulation specifies convex hull for individual battery storage if $C^p_T \leq C^g_T$.

For T>1, we can also similarly prove that the necessary condition for $g_t > 0$, $p_t > 0$ and $0 < u_t < 1$ to occur is if:

$$\lambda_t = \frac{\beta C^p_t - \alpha C^g_t - \alpha\delta''_t - \beta\gamma''_t - \alpha\beta(\sigma''_t + \sigma'_t)}{(\beta-\alpha)} \leq \frac{\beta C^p_t - \alpha C^g_t}{(\beta-\alpha)}$$

It is again the same condition as (13).

Case Studies

One Interval Small Example

Assume a battery with: $\bar{p}=\bar{g}=6$ MW, $\alpha=0.9$, $\beta=1/0.9$, $C_t^p=\$1/\text{MWh}$ and $C_t^g=\$3/\text{MWh}$, $s_0=5$ MWh, $\bar{s}=10$ MWh, $\underline{s}=0$ MWh. The cleared discharging MW is $g_t$, charging MW is $p_t$, and SOC is $s_t$.

Assume the system has one thermal generator with offer C/MWh. The generator can be dispatched between 0 and 10 MW with cleared MW represented by $G_t$. Also assume load is 5 MW for all intervals.

First, assume single interval T=1. The sufficient condition for mutually exclusive charging and discharging mode in the clearing is for LMP to be above $$\frac{\beta C_t^p - \alpha C_t^g}{(\beta - \alpha)} = -\$7.526/\text{MWh}.$$

In the following cases, we will consider the alternatives of the LMP being just slightly below and just slightly above this threshold.

1) Conventional battery storage formulation with convex form (model UCED). The single interval clearing result is shown in Table 1 for C=−$7.52/MWh and −$7.53/MWh.

TABLE 1

Single interval conventional ED model

| C ($/MWh) | $G_1$(MW) | $g_1$(MW) | $p_1$(MW) | $s_1$(MWh) | $LMP_1$ ($/MWh) |
|---|---|---|---|---|---|
| −7.52 | 10.56 | 0 | 5.56 | 10 | −7.52 |
| −7.53 | 10.64 | 0.36 | 6 | 10 | −7.53 |

According to some embodiments, Table 1 shows that under model UCED, when $$LMP = -\$7.53/\text{MWh} < \frac{\beta C_t^p - \alpha C_t^g}{(\beta - \alpha)},$$

the storage may simultaneously clear non-zero $g_1$ and $p_1$ even under single interval. When $$LMP = -\$7.52/\text{MWh} > \frac{\beta C_t^p - \alpha C_t^g}{(\beta - \alpha)},$$

there is no simultaneous clearing of charging and discharging MW.

2) Relaxation of the conventional battery storage formulation with binary variable (model UCED_BIN_Rel). The single interval clearing result is shown in Table 2 under C=−$7.52/MWh and C=−$7.53/MWh.

TABLE 2

Single interval conventional EDBIN_Rel model

| C ($/MWh) | $G_1$ (MW) | $g_1$ (MW) | $p_1$ (MW) | $s_1$ (MWh) | $LMP_1$ ($/MWh) | $u_1$ |
|---|---|---|---|---|---|---|
| −7.52 | 10.56 | 0 | 5.56 | 10 | −7.52 | 0 |
| −7.53 | 10.6 | 0.2 | 5.8 | 10 | −7.53 | 0.033 |

According to some embodiments, Table 2 shows that under model UCED_BIN_Rel, when $$LMP < \frac{\beta C_t^p - \alpha C_t^g}{(\beta - \alpha)},$$

the storage may simultaneously clear non-zero $g_1$ and $p_1$ with $u_1$ at a fractional value even in a single interval case. When $$LMP > \frac{\beta C_t^p - \alpha C_t^g}{(\beta - \alpha)},$$

there is no simultaneous clearing of charging and discharging MW and $u_1$ is binary at the solution of the relaxed problem.

3) Tightened battery storage formulation with convex relaxation UCED_T:

With C=−$100/MWh, the clearing result is $g_1=0$ and $p_1=5.56$ MW. $s_1=10$ MWh. The generator output is $G_1=10.56$ MW. LMP=−$100/MWh.

Hence, with the UCED_T model, it does not clear non-zero $g_1$ and $p_1$ simultaneously for the single interval even with a very negative LMP. This demonstrates that the tightened formulation improves on the relaxation of the conventional battery formulation for this (special) single interval case.

4) Relaxation of the tightened battery storage formulation with binary variable (model UCED_BIN_T_Rel:

With C=−$100/MWh, the clearing result is $g_1=0$ and $p_1=5.56$ MW. $u_1=0$, $s_1=10$ MWh. The generator output is $G_1=10.56$ MW. LMP=−$100/MWh.

Hence, with the EDBIN_T model, it does not clear non-zero $g_1$ and $p_1$ simultaneously for the single interval even with a very negative LMP if $u_1$ is required to be binary.

Two Interval Small Example

The tightened battery storage formulation with T=2 may be examined. The same battery and generator offer parameters may be assumed for both intervals as for the previous example.

1) Tightened battery storage formulation with convex relaxation UCED_T. The 2-interval clearing result is shown in Table 3 under C=−$7.52/MWh and C=−$7.53/MWh.

TABLE 3

Two-interval enhanced ED_T model

| C ($/MWh) | $G_1$(MW) | $g_1$(MW) | $p_1$(MW) | $s_1$ (MWh) | $LMP_1$ ($/MWh) |
|---|---|---|---|---|---|
| −7.52 | 5 | 0 | 0 | 5 | −7.52 |
| −7.53 | 5.6 | 4.5 | 5.1 | 4.6 | −7.53 |

| C ($/MWh) | $G_2$(MW) | $g_2$(MW) | $p_2$(MW) | $s_2$(MWh) | LMP2 ($/MWh) |
|---|---|---|---|---|---|
| −7.52 | 10.56 | 0 | 5.56 | 10 | −7.52 |
| −7.53 | 11 | 0 | 6 | 10 | −7.53 |

According to some embodiments, Table 3 demonstrates that with the tightened model, when $$LMP < \frac{\beta C_t^p - \alpha C_t^g}{(\beta - \alpha)},$$

the storage may simultaneously clear non-zero $g_1$ and $p_1$ if the SOC upper limit binds for $t>1$. When the $$LMP > \frac{\beta C_t^p - \alpha C_t^g}{(\beta - \alpha)},$$

battery storage does not clear simultaneously for charging and discharging.

2) Relaxation of the enhanced battery storage formulation with binary variable (model UCEDBIN_T_Rel). The 2-interval clearing result is shown in Table 4 under C=−$7.52/MWh and C=−$7.53/MWh.

TABLE 4

Two-interval enhanced UCED_BIN_E_Rel model

| C ($/MWh) | $G_1$ (MW) | $g_1$ (MW) | $p_1$ (MW) | $s_1$ (MWh) | $LMP_1$ ($/MWh) | $u_1$ |
|---|---|---|---|---|---|---|
| −7.52 | 10.56 | 0 | 5.56 | 10 | −7.52 | 0 |
| −7.53 | 5.232 | 2.884 | 3.116 | 4.6 | −7.53 | 0.48 |

| C ($/MWh) | $G_2$ (MW) | $g_2$ (MW) | $p_2$ (MW) | $s_2$ (MWh) | $LMP_2$ ($/MWh) | $u_2$ |
|---|---|---|---|---|---|---|
| −7.52 | 5 | 0 | 0 | 10 | −7.52 | 0 |
| −7.53 | 11 | 0 | 6 | 10 | −7.53 | 0 |

According to some embodiments, Table 4 demonstrates that with the enhanced model, when $$LMP < \frac{\beta C_t^p - \alpha C_t^g}{(\beta - \alpha)},$$

the storage may simultaneously clear $g_1$ and $p_1$ with $u_1$ at fractional if the SOC upper limit binds for $t>1$. When $$LMP > \frac{\beta C_t^p - \alpha C_t^g}{(\beta - \alpha)},$$

battery storage clears with exclusive charging and discharging, and also solves with binary value of $u_t$.

The last interval always clears with mutually exclusive charging and discharging as well as a binary value of $u_T$.

C. MISO Day Ahead Cases—Normal Cases

According to some embodiments, batteries co-located with each wind generator offered into the Midcontinent ISO (MISO) day ahead market may be simulated. For example, 10 day ahead cases from 2019 that were normal or typical in terms of their computation time before the addition of batteries were studied. The numbers of batteries added for each case range from 169 to 203. The power capacity of the battery is the lesser of 20 MW or the maximum limit of the wind generator and with a duration of 4 hours of storage and α=0.9 and β=1/α. All batteries are offered with $C_t^p=C_t^g=\$0$ for energy arbitrage. MISO production day ahead SCUC MIP stops when one of the following three criteria is satisfied: 1) the solving time limit of 1,200 seconds is reached, 2) the MIP relative gap tolerance is 0.1%, 3) the MIP absolute gap tolerance is $24,000. The cases are run on a Linux server with 32 Intel Core Processor (Haswell, no TSX, IBRS) and 528 GB memory.

With the same stopping criteria, FIG. 1 illustrates an exemplary comparison of Mixed-Integer Programming (MIP) solving time under different battery storage models.

Conventional battery storage formulation with convex relaxation (UCED). Under this model, batteries with negative LMP may simultaneously clear charging and discharging MW. But there are no binary variables for the batteries so solving time might be expected to be less than for the models with binary variables.

Conventional battery storage formulation with binary (UCED_BIN). With the binary variables, the mutual exclusivity of charging and discharging mode is always enforced.

Tightened battery storage formulation with binary (UCED_BIN_T). With the binary variables, the mutual exclusivity of charging and discharging mode is always enforced.

To reduce the number of non-zeros in the constraint matrix of the models, a compact form for the SOC constraints may be used. In particular, for the conventional formulation, (7) and (8) are replaced by:

$$s_t = s_{t-1} + \alpha \cdot p_t - \beta \cdot g_t \quad (7')$$

$$s_t \text{ has a lower bound } \underline{s} \text{ and upper bound } \overline{s} \quad (8')$$

For the tightened formulation, (28') and (27') are replaced by (7'), (27), and (28).

The results in FIG. 1 ("No Battery" and "Battery—UCED") show that adding batteries can increase MIP solving time significantly. However, somewhat contrary to expectations, the solving times under "Battery—UCED_BIN" are mostly similar to or less than the solving time under ED. Hence, removing the binaries in the storage formulation does not lead to faster solution.

TABLE 5

Problem size comparison

| | | Rows | Columns | non-zeros | continuous variables | binary variables |
|---|---|---|---|---|---|---|
| | | Before Pre-solve | | | | |
| No battery (a) | [(a) − (a)]/(a) | 0.00% | 0.00% | 0.00% | 0.00% | 0.00% |
| Battery UCED (b) | [(b) − (a)]/(a) | 0.98% | 2.00% | 1.08% | 2.32% | 0.00% |
| Battery UCED_BIN (c) | [(c) − (a)]/(a) | 2.95% | 2.67% | 1.62% | 2.32% | 4.88% |
| Battery UCED_BIN_T (d) | [(d) − (a)]/(a) | 4.91% | 2.67% | 2.16% | 2.32% | 4.88% |

TABLE 5-continued

Problem size comparison

| | | Rows | Columns | non-zeros | continuous variables | binary variables |
|---|---|---|---|---|---|---|
| | | | | After Pre-solve | | |
| No battery (a) | [(a) − (a)]/(a) | 0.00% | 0.00% | 0.00% | 0.00% | 0.00% |
| Battery UCED (b) | [(b) − (a)]/(a) | 2.83% | 3.35% | 1.97% | 3.70% | 0.00% |
| Battery UCED BIN (c) | [(c) − (a)]/(a) | 8.09% | 4.36% | 2.83% | 3.63% | 11.34% |
| Battery UCED_BIN_T (d) | [(d) − (a)]/(a) | 13.04% | 4.30% | 3.75% | 3.56% | 11.34% |

Even though the tightened formulation is a closer approximation to the convex hull than the conventional formulation, the solving time ("Battery—UCED_BIN_T") is not necessarily faster. Part of the reason is because the tightened model UCED_BIN_T introduces more rows and non-zeros to the constraint matrix of the MIP model than the conventional model UCED_BIN. Table 5 compares the MIP problems size for the day ahead SCUC model without batteries and with batteries under UCED, UCED_BIN and UCED_BIN_T models.

To address the issue of adding too many rows and non-zeros under the tightened storage model UCED_BIN_T, "lazy" constraint techniques may be utilized.

Gurobi provides a constraint attribute "Lazy" [9]. A constraint whose Lazy attribute is set to 1, 2, or 3 (the default value is 0) is removed from the model and placed in the lazy constraint pool. When a new solution is found, it is checked against the lazy constraint pool and violated lazy constraints may be added to the active model. With a value of 3, lazy constraints that cut off the relaxation solution at the root node are also incorporated.

According to some embodiments, Gurobi "lazy" attribute may be first used on UCED_BIN_T, e.g., UCED_BIN_-T with SOC constraints (7')(8')(22) and (23) and all constraints (22) and (23) may be set as lazy=3. Gurobi started with removing (22) and (23) from the model and placed them in the lazy pool. With binary variables, $p_t$ and $g_t$ should not clear simultaneously and (7')(8') should be satisfied for any new incumbent solutions. Hence, (22) and (23) should also be satisfied. However, (22) and (23) may be violated in the relaxation solution in the case that the binary variables have fractional values in the relaxation solution.

Figure 2:
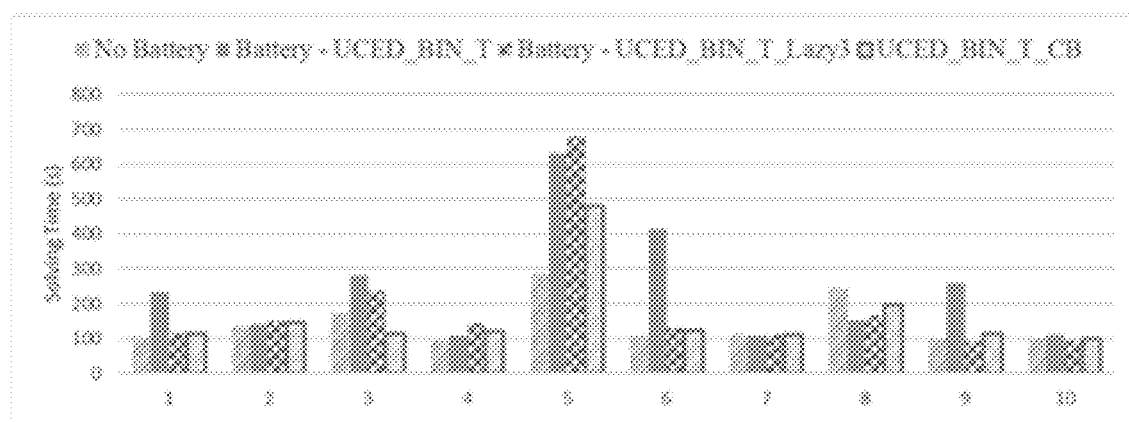
FIG. 2 illustrates an exemplary comparison of MIP solving time under different battery storage models using a Gurobi "lazy" attribute, among other things.

According to some embodiments, FIG. 2 illustrates an exemplary comparison of MIP solving time under different battery storage models using a Gurobi "lazy" attribute. FIG. 2 shows that the lazy setting ("Battery—UCED_BIN_T_Lazy3") is very effective for case 1, 6, and 9. For most of the other cases, the solving times with lazy=3 are similar to the default ("Battery—UCED_BIN_E"). However, lazy setting slightly increases the solving time for case 5.

According to some embodiments, it may then be experimented to start with EDBIN and then add (22) and (23) through call back ("UCED_BIN_T_CB"). At each new Gurobi MIPNODE relaxation solution, it may be checked if (22) or (23) is violated under the relaxation solution. Only the constraints that are violated by over 1% of the maximum SOC of the battery (i.e., $0.01 \cdot \bar{s}$) may be added and no more than 200 in total may be added. This approach is very effective for case 5 and 3. This approach has similar computation time to Gurobi Lazy3 for other cases.

To summarize, with UCED_BIN_T_Lazy3 and UCED_BIN_T_CB, the solving times for 9 out of 10 cases are similar to the "No Battery" model. The solving time of case 5 increases by about 200-300 s. It is still within 700 seconds and is still considered normal from the perspective of computation time. In the next section, we build on this experience for several hard MISO cases.

MISO Day Ahead Cases—Hard Cases

According to some embodiments, the results from 9 day ahead cases from 2014 that were hard in terms of the computation time even before the addition of optimization for batteries may be shown. The numbers of batteries added for each case range from 129 to 176. The power capacity of the battery is the lesser of 20 MW or the maximum limit of the wind generator with a duration of 4 hours of storage and $\alpha=0.9$ and $\beta=1/\alpha$. All batteries are offered with $C_t^p = C_t^g = \$0$.

This set of cases can solve with below 1% gap at 1,200 seconds without the batteries. But most of them cannot reach 0.1% or \$24,000 MIP gap tolerance before timing out at 1,200 seconds. A solution below 1% MIP gap is considered acceptable and is refined through a polishing procedure [7].

TABLE 6

MIP gap and solving time comparison—hard cases

| | No battery | | Battery—UCED | | Battery—UCED_BIN | | Battery—UCED_T | | UCED_BIN_T | |
|---|---|---|---|---|---|---|---|---|---|---|
| | MIP Gap | time (s) | MIP Gap | time (s) | MIP Gap | time(s) | MIP Gap | time (s) | MIP Gap | time (s) |
| case 1 | 0.16% | 1207 | 0.09% | 2067 | 0.16% | 3001 | 0.09% | 2067 | 0.16% | 3001 |
| case 2 | 0.39% | 767 | 0.43% | 1018 | 0.37% | 1148 | 0.43% | 1018 | 0.37% | 1148 |
| case 3 | 0.89% | 1213 | 0.24% | 2964 | 0.55% | 3001 | 0.24% | 2964 | 0.55% | 3001 |
| case 4 | 0.34% | 1214 | 0.26% | 3001 | 0.23% | 3000 | 0.26% | 3001 | 0.23% | 3000 |
| case 5 | 0.11% | 809 | 0.10% | 903 | 0.13% | 1123 | 0.10% | 903 | 0.13% | 1123 |
| case 6 | 2.69% | 1224 | 2.32% | 3000 | 2.68% | 3003 | 2.32% | 3000 | 2.68% | 3003 |
| case 7 | 0.58% | 1206 | 1.07% | 3001 | 0.78% | 3000 | 1.07% | 3001 | 0.78% | 3000 |
| case 8 | 3.85% | 234 | 4.10% | 1238 | 4.62% | 1147 | 4.10% | 1238 | 4.62% | 1147 |
| case 9 | 0.90% | 1211 | 3.56% | 3001 | 0.32% | 2972 | 3.56% | 3001 | 0.32% | 2972 |
| Average | | 1010 | | 2244 | | 2377 | | 2244 | | 2377 |

With the added batteries, it can take Gurobi8.0 up to 1,400 seconds to find the first incumbent solution with all three models. According to some embodiments, Table 6 compares MIP gap and solving time for the model with no battery, with conventional battery non-binary formulation (UCED), conventional battery binary formulation (UCED_BIN), tightened battery non-binary formulation (UCED_T) and tightened battery binary formulation (UCED_BIN_T). The solving time increases significantly by adding the batteries. Similar to the normal cases, adding binary variables to the non-binary formulation typically only has minor impact on the solving time.

According to some embodiments, the model with binary variables may be focused on for the remaining of the hard case study.

1) MIP Cold Start

TABLE 7

Comparison of MIP solving time—hard case cold start

| Time Limit | No battery | | UCED_BIN | | UCED_BIN_T | | | UCED_BIN_T_Lazy3 | | |
|---|---|---|---|---|---|---|---|---|---|---|
| | | | | | | | Objective relative to UCED_BIN ("−" means | | | Objective relative to UCED_BIN ("−" means |
| 3000s | MIP Gap | time (s) | MIP Gap | time (s) | MIP Gap | time (s) | reduction) | MIP Gap | time (s) | reduction) |
| case 1 | 0.16% | 1207 | 0.16% | 3000 | 0.10% | 2595 | −$15,337 | 0.10% | 2179 | −$19,664 |
| case 2 | 0.39% | 767 | 0.37% | 1185 | 0.53% | 3026 | $11,093 | 0.44% | 1089 | $3,613 |
| case 3 | 0.89% | 1213 | 0.55% | 3003 | 0.56% | 3000 | $763 | 0.51% | 3000 | −$3,475 |
| case 4 | 0.34% | 1214 | 0.23% | 3000 | 0.22% | 3000 | −$1,262 | 0.28% | 3000 | $7,617 |
| case 5 | 0.11% | 809 | 0.13% | 1199 | 0.13% | 1146 | −$391 | 0.15% | 3023 | −$3,478 |
| case 6 | 2.69% | 1224 | 2.68% | 3003 | 2.01% | 3023 | −$4,425 | 2.48% | 3003 | −$2,046 |
| case 7 | 0.58% | 1206 | 0.78% | 3000 | 0.77% | 3000 | $13,326 | 1.64% | 3000 | $113,668 |
| case 8 | 3.85% | 234 | 4.62% | 1156 | 6.71% | 1337 | $7,646 | 3.66% | 1137 | −$1,143 |
| case 9 | 0.90% | 1211 | 0.32% | 2912 | 1.01% | 3001 | $28,731 | 0.80% | 3000 | $20,849 |
| Average | | 1010 | | 2384 | | 2570 | $4,460 | | 2492 | $12,882 |

Most cases with battery cannot solve to MIP gap tolerance within 3,000 seconds under the conventional battery formulation. The tightened formulation has more rows and nonzeros. Again, even though it is a closer approximation to the convex hull, the overall performance is not necessarily better. Table 7 compares MIP gap, solving time and objective differences under no battery, UCED_BIN, UCED_BIN_T and UCED_BIN_T_Lazy3.

First compare UCED_BIN_T to UCED_BIN. Three cases are solved with either improved time or improved objective under UCED_BIN_T. However, the average solving times and objectives increase slightly.

Secondly, compare UCED_BIN_T_Lazy3 to UCED_BIN, 6 cases are solved with either improved time or improved objective under UCED_BIN_T_Lazy3. However, case 7 objective increases significantly. A possible explanation for this observation is that lazy constraint settings and callback may turn off advanced features in commercial solvers.

Overall, the tightened formulation under MIP cold start shows some benefit. But the impact is not consistent. To try to harness the benefits of the tightened formulation without greatly increasing the computation time, we consider a hybrid warm start approach in the next section.

2) MIP Warm Start

Most of the cases without batteries can solve to 3% gap very fast. In this section, the model without battery with 500 seconds and 3% MIP gap tolerance may be solved first. The generator commitment decisions may then be used as the MIP start for the model with battery (i.e., warm start).

TABLE 8

Comparison of MIP solving time - hard case warm start

| | Non-battery 3% gap or 500s | | | UCED_BIN | | UCED_BIN_T | | | UCED_BIN_T_Lazy3 | | |
|---|---|---|---|---|---|---|---|---|---|---|---|
| Time Limit 1800s MIP start from | | Battery model MIP start | | | | | | Objective relative to UCED_BIN ("−" means | | | Objective relative to UCED_BIN ("−" means |
| non-battery | time (s) | initial gap | | MIP Gap | time (s) | MIP Gap | time (s) | reduction) | MIP Gap | time (s) | reduction) |
| case 1 | 127 | 0.59% | | 0.19% | 1800 | 0.19% | 1801 | −$13 | 0.13% | 1800 | −$23,825 |
| case 2 | 129 | 2.61% | | 0.44% | 1347 | 0.41% | 1763 | −$1,214 | 0.36% | 943 | −$5,377 |
| case 3 | 268 | 1.82% | | 1.70% | 1800 | 1.68% | 1800 | −$1,185 | 1.71% | 1800 | −$1,185 |
| case 4 | 258 | 0.51% | | 0.28% | 1802 | 0.28% | 1800 | −$1,113 | 0.27% | 1800 | $159 |
| case 5 | 122 | 0.99% | | 0.10% | 929 | 0.13% | 1080 | −$54 | 0.14% | 1529 | −$2,817 |
| case 6 | 506 | 6.77% | | 3.49% | 1801 | 2.84% | 1801 | −$6,280 | 4.72% | 1816 | $16,855 |
| case 7 | 265 | 2.06% | | 1.71% | 1801 | 1.01% | 1800 | −$95,604 | 1.43% | 1803 | −$38,955 |

TABLE 8-continued

Comparison of MIP solving time - hard case warm start

| Non-battery 3% gap or 500s | | | | | UCED_BIN_T | | | UCED_BIN_T_Lazy3 | | |
|---|---|---|---|---|---|---|---|---|---|---|
| Time Limit 1800s MIP start from non-battery | time (s) | Battery model MIP start initial gap | UCED_BIN MIP Gap | time (s) | MIP Gap | time (s) | Objective relative to UCED_BIN ("−" means reduction) | MIP Gap | time (s) | Objective relative to UCED_BIN ("−" means reduction) |
| case 8 | 209 | 17.60% | 6.76% | 597 | 6.72% | 655 | −$489 | 6.35% | 719 | −$7 |
| case 9 | 424 | 1.78% | 0.80% | 1800 | 0.83% | 1801 | −$707 | 0.56% | 1800 | −$12,696 |
| Average | 257 | | | 1520 | | 1589 | −$11,851 | | 1557 | −$7,539 |

For most cases, the commitment decisions from the non-battery model result in a very good initial solution for the battery model as shown in Table 8 column "Battery model MIP start initial gap". Starting from that, most cases can reach below 1% gap in 1800 s with the UCED_BIN, UCED_BIN_T and UCED_BIN_Lazy3 models.

Compared to UCED_BIN, UCED_BIN_T solutions have lower objectives for all cases. The solving time for case 2 increases by about 400 s with UCED_BIN_T and the time for all other cases are similar between UCED_BIN_T and UCED_BIN.

UCED_BIN_T_Lazy3 is significantly better than UCED_BIN_T for case 1, 2 and 9 and worse than UCED_BIN_T and UCED_BIN for case 6.

In [8], the concurrent SCUC solver is developed to solve multiple solution methods in parallel under HIPPO. The best upper bound and lower bound solution is sent to HIPPO master and the solution process stops when it meets the stopping criteria. The enhanced battery formulation, warm start, and lazy constraint settings can be applied with various strategies to achieve the best outcome using such a parallel approach.

Figure 3:
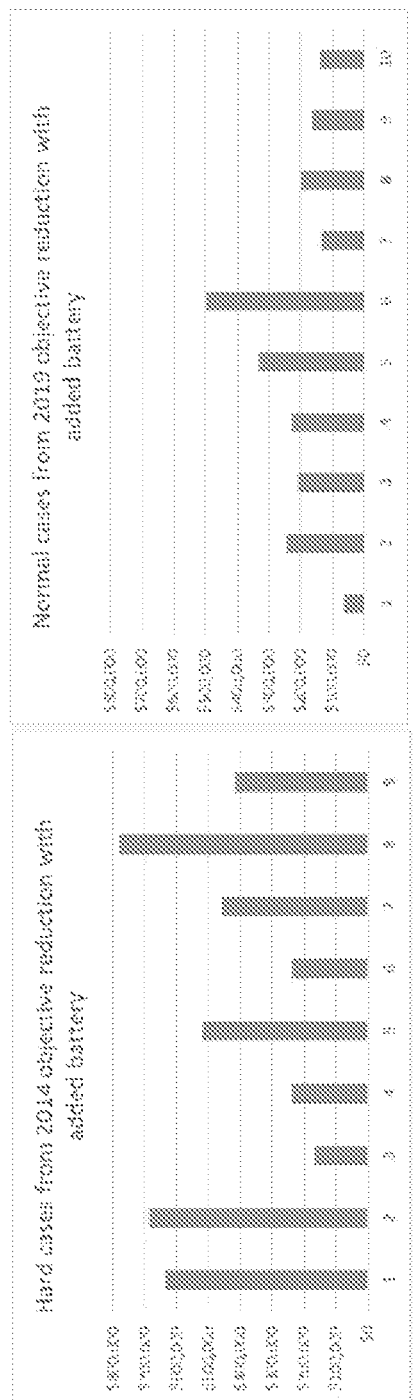
FIG. 3 illustrates an exemplary reduction of production cost (e.g., with added batteries), among other things.

According to some embodiments, FIG. 3 shows production cost reduction from each of the 19 MISO day ahead cases after adding battery storage to the wind farms. Each case has 36 hourly intervals. This represents the system benefit from RTO/ISO optimizing the batteries globally. For the 2014 hard cases, the average daily benefit (prorated to 24 hours) is about $290,000 (about 4% of the average daily objective value). For 2019 normal cases, the average daily benefit is about $147,000 (about 3% of the average daily objective value). The overall benefit to the system could be significant. Batteries combined with renewables may also provide additional benefit in real time in firming capacity and providing flexibility.

According to some embodiments, the conventional and the tighter SOC formulations are analyzed with and without binary variables for battery storage. Conditions are derived for mutual exclusivity of charging and discharging when binary variables are relaxed or omitted. Case studies validated the conditions. A MISO case study of both hard and normal day ahead market clearing cases show significant computational challenges introduced from SOC constraints and show the benefit from adding the tightened SOC formulation with lazy constraints or callback. According to some embodiments, it is also revealed that binary variables on battery models may not add more challenges, while warm start from the solution without batteries may significantly improve the solving time.

Figure 4:
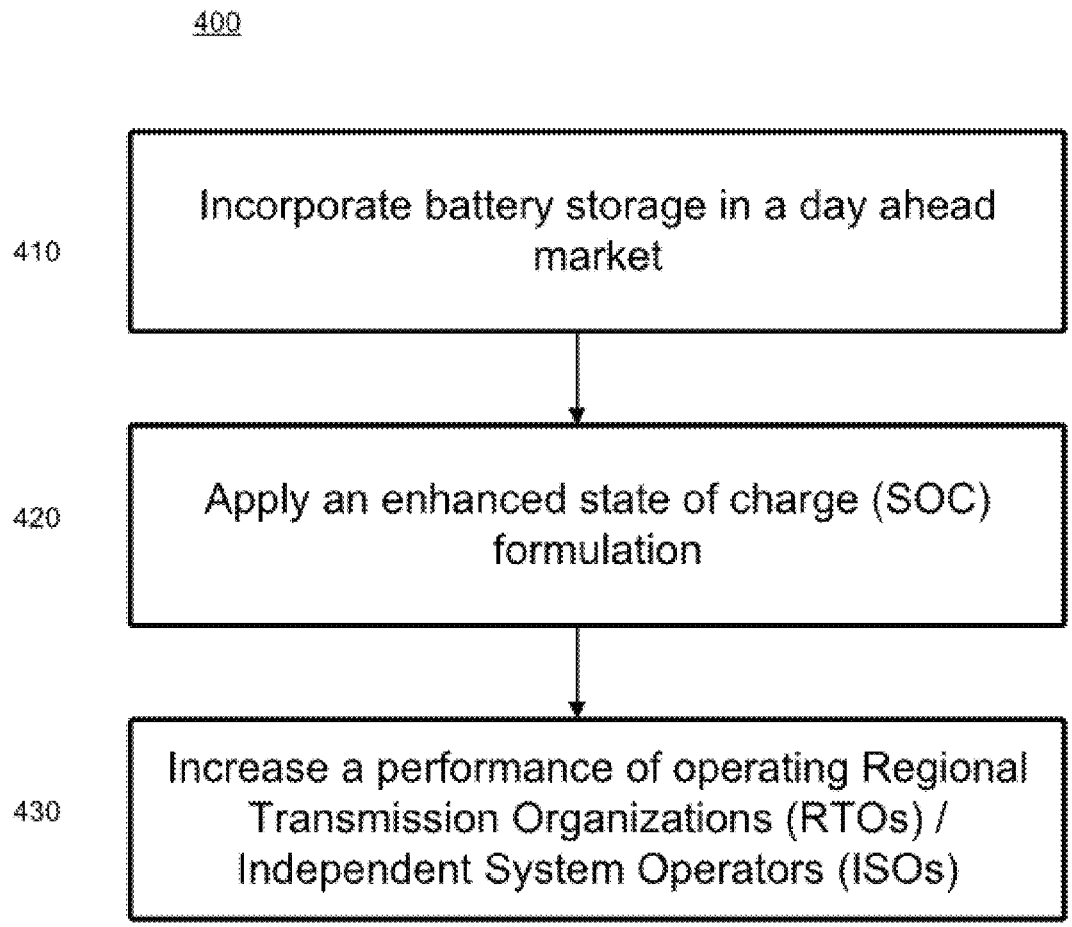
FIG. 4 illustrates an exemplary method for incorporating battery storage in a day ahead market, among other things.

FIG. 4 illustrates an exemplary method 400 for incorporating battery storage in a day ahead market. In some examples, the method 400 is performed by a device or machine. Moreover, the method 400 may be performed at a network device, desktop, laptop, mobile device, server device, or by multiple devices in communication with one another. In some examples, the method 400 is performed by processing logic, including hardware, firmware, software, or a combination thereof. In some examples, the method 400 is performed by a processor executing code stored in a computer-readable medium (e.g., a memory).

At block 410, the method 400 may incorporate battery storage in a day ahead market. For example, the battery storage may be incorporated in the day ahead market for operating RTOs/ISOs to increase a performance of the RTOs/ISOs (e.g., to speed up performance and/or make valid inequalities more effective).

At block 420, the method 400 may apply an enhanced SOC formulation. For example, the enhanced SOC may include warm start techniques and/or lazy constraint techniques to speed up the performance and make the valid inequalities more effective. As another example, one binary variable $u_t$ may be added for each battery to a battery storage model to ensure mutual exclusivity of charging and discharging modes. An another example, one binary variable $u_t$ may be added for each battery as in the following problem (UCED_BIN) to ensure mutual exclusivity of charging and discharging modes under any prices, $$\text{UCED\_BIN} = \text{Min} \sum_{t=1}^{T} \left[ -C_t^p p_t + C_t^g g_t \right] + C_k(x_k, y_k^0)$$

s.t. (1)(2)(3)(5)(7)(8)

$$g_t - \bar{g} u_t \le 0 \tag{15.BIN}$$

$$p_t - \bar{p}(1 - u_t) \le 0 \tag{16.BIN}$$

$$u_t \in \{0, 1\} \tag{17.BIN}$$

At block 430, the method 400 may increase a performance of operating RTOs/ISOs based on the enhanced SOC formulation. For example, a speed of the RTOs/ISOs may be increased and/or valid inequalities may be made more effective Examples of the methods disclosed herein may be performed in the operation of such computing devices. The order of the blocks presented in the examples herein can be varied. For example, blocks can be re-ordered, combined, or broken into sub-blocks. Certain blocks or processes can be performed in parallel.

Figure 5:
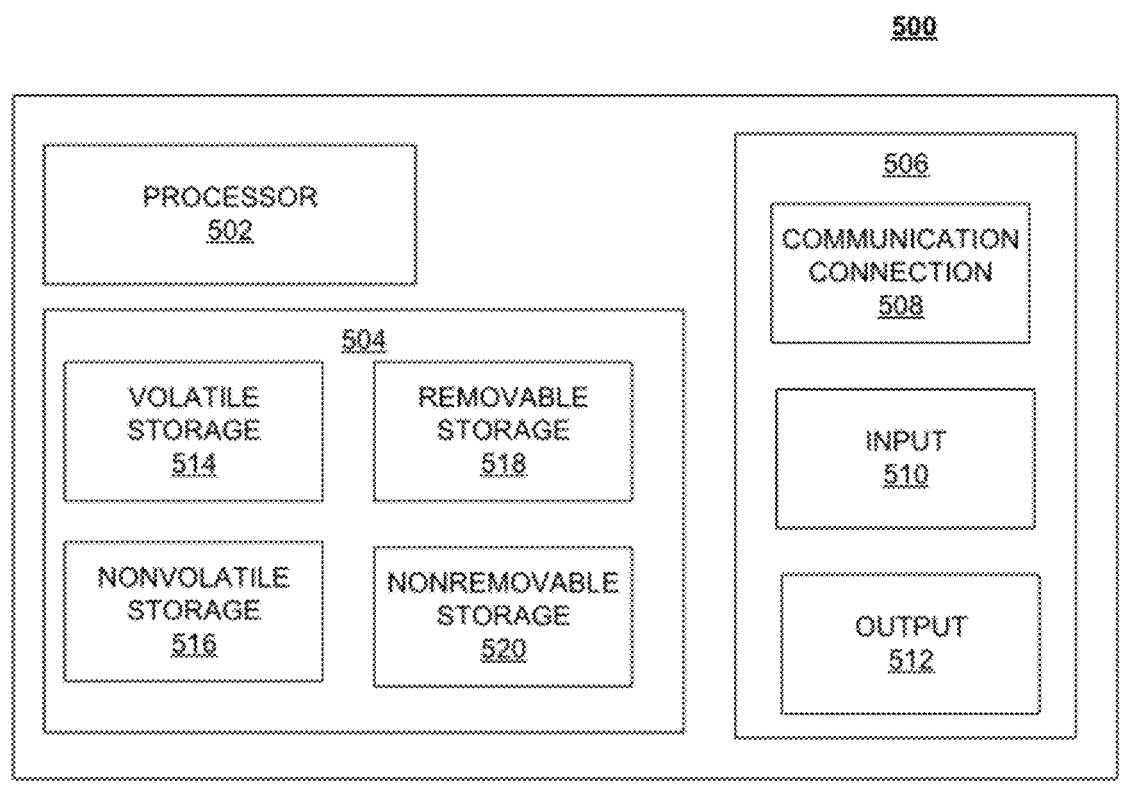
FIG. 5 illustrates a schematic of an exemplary network device.

FIG. 5 is a block diagram of a network device 500 that may be connected to or comprise a component of a network 112. Network device 500 may comprise hardware or a combination of hardware and software. The functionality to facilitate communications via a communications network 112 may reside in one or a combination of network device 500. Network device 500 depicted in FIG. 5 may represent or perform functionality of an appropriate network device 500, or a combination of network devices 500, such as, for example, a component or various components of a cellular broadcast system wireless network, a processor, a server, a gateway, an LTE or 5G anchor node or eNB, a mobile switching center (MSC), a short message service center (SMSC), an automatic location function server (ALFS), a gateway mobile location center (GMLC), a serving gateway (S-GW), a packet data network (PDN) gateway, an RAN, a serving mobile location center (SMLC), or the like, or any appropriate combination thereof. It is emphasized that the block diagram depicted in FIG. 5 is exemplary and not intended to imply a limitation to a specific example or configuration. Thus, network device 500 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 500 may comprise a processor 502 and a memory 504 coupled to processor 502. Memory 504 may contain executable instructions that, when executed by processor 502, cause processor 502 to effectuate operations associated with battery storage. As evident from the description herein, network device 500 is not to be construed as software per se.

In addition to processor 502 and memory 504, network device 500 may include an input/output system 506. Processor 502, memory 504, and input/output system 506 may be coupled together (coupling not shown in FIG. 5) to allow communications between them. Each portion of network device 500 may comprise circuitry for performing functions associated with each respective portion. Thus, each portion may comprise hardware, or a combination of hardware and software. Accordingly, each portion of network device 500 is not to be construed as software per se. Input/output system 506 may be capable of receiving or providing information from or to a communications device or other network entities configured for telecommunications. For example, input/output system 506 may include a wireless communications (e.g., 3G/4G/5G/GPS) card. Input/output system 506 may be capable of receiving or sending video information, audio information, control information, image information, data, or any combination thereof. Input/output system 506 may be capable of transferring information with network device 500. In various configurations, input/output system 506 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 506 may comprise a Wi-Fi finder, a two-way GPS chipset or equivalent, or the like, or a combination thereof.

Input/output system 506 of network device 500 also may contain a communication connection 508 that allows network device 500 to communicate with other devices, network entities, or the like. Communication connection 508 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 506 also may include an input device 510 such as keyboard, mouse, pen, voice input device, or touch input device. Input/output system 506 may also include an output device 512, such as a display, speakers, or a printer.

Processor 502 may be capable of performing functions associated with energy storage, such as functions for performing battery storage formulations, as described herein. For example, processor 502 may be capable of, in conjunction with any other portion of network device 500, increasing performance of RTOs/ISOs, as described herein.

Memory 504 of network device 500 may comprise a storage medium having a concrete, tangible, physical structure. As is known, a signal does not have a concrete, tangible, physical structure. Memory 504, as well as any computer-readable storage medium described herein, is not to be construed as a signal. Memory 504, as well as any computer-readable storage medium described herein, is not to be construed as a transient signal. Memory 504, as well as any computer-readable storage medium described herein, is not to be construed as a propagating signal. Memory 504, as well as any computer-readable storage medium described herein, is to be construed as an article of manufacture.

Memory 504 may store any information utilized in conjunction with communications. Depending upon the exact configuration or type of processor, memory 504 may include a volatile storage 514 (such as some types of RAM), a nonvolatile storage 516 (such as ROM, flash memory), or a combination thereof. Memory 504 may include additional storage (e.g., a removable storage 518 or a non-removable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 500. Memory 504 may comprise executable instructions that, when executed by processor 502, cause processor 502 to effectuate operations to incorporate battery storage in a day ahead market.

Figure 6:
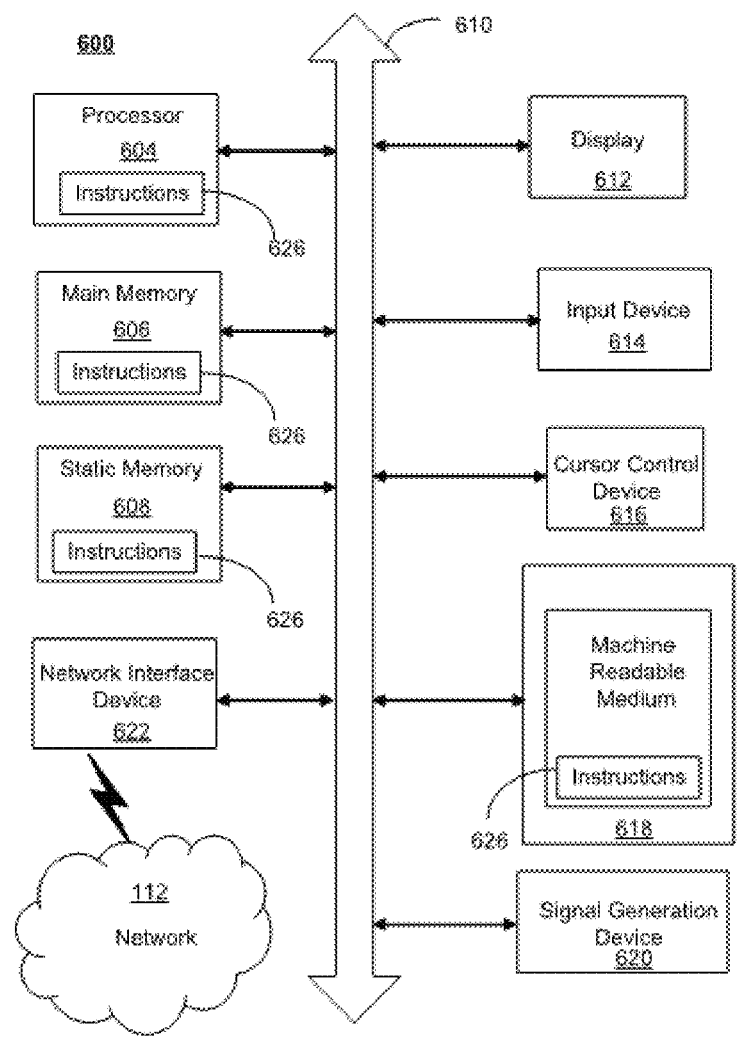
FIG. 6 illustrates an exemplary diagrammatic representation of a machine in the form of a computer system.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as processor 502 and other devices of FIG. 5. In some examples, the machine may be connected (e.g., using a network 112) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 600 may include a processor (or controller) 604 (e.g., a central processing unit (CPU)), a graphics processing unit (GPU, or both), a main memory 606 and a static memory 608, which communicate with each other via a bus 610. The computer system 600 may further include a display unit 612 (e.g., a liquid crystal display (LCD), a flat panel, or a solid-state display). Computer system 600 may include an input device 614 (e.g., a keyboard), a cursor control device 616 (e.g., a mouse), a disk drive unit 618, a signal generation device 620 (e.g., a speaker or remote control) and a network interface device 622. In distributed environments, the examples described in the subject disclosure can be adapted to utilize multiple display units 612 controlled by two or more computer systems 600. In this configuration, presentations described by the subject disclosure may in part be shown in a first of display units 612, while the remaining portion is presented in a second of display units 612.

The disk drive unit 618 may include a tangible computer-readable storage medium on which is stored one or more sets of instructions (e.g., instructions 626) embodying any one or more of the methods or functions described herein, including those methods illustrated above. Instructions 626 may also reside, completely or at least partially, within main memory 606, static memory 608, or within processor 604 during execution thereof by the computer system 600. Main memory 606 and processor 604 also may constitute tangible computer-readable storage media.

While examples of a system for incorporating battery storage in a day ahead market have been described in connection with various computing devices/processors, the underlying concepts may be applied to any computing device, processor, or system capable of facilitating a battery storage system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an erasable programmable read-only memory (EPROM), a gate array, a programmable logic device (PLD), a client computer, or the like, the machine becomes a device for implementing battery storage as described herein. When implemented on a general purpose processor, the program code combines with the processor to provide a unique device that operates to invoke the functionality of system for operating RTOs/ISOs.

While the disclosed systems have been described in connection with the various examples of the various figures, it is to be understood that other similar implementations may be used, or modifications and additions may be made to the described examples without deviating therefrom. Therefore, the disclosed systems as described herein should not be limited to any single example, but rather should be construed in breadth and scope in accordance with the appended claims.

In describing preferred methods, systems, or apparatuses of the subject matter of the present disclosure—incorporating battery storage in a day ahead market, applying an enhanced SOC formulation, increasing a performance of operating RTOs/ISOs—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

What is claimed:

1. A method of incorporating battery storage into a day ahead energy market clearing case, the method comprising:
incorporating battery storage in a day ahead market clearing case; and
applying an enhanced state of charge (SOC) formulation to a representation of battery storage in the day ahead market clearing case, wherein the SOC formulation utilizes a tightened battery storage model as follows:

$$\text{UCED\_BIN}\_T = \text{Min } \Sigma_{t=1}^{T}[-C_t^p p_t + C_t^g g_t] + C_k(x_k, y_k^0)$$

s.t. (1) (2) (3) (5), (15)-(18), (24) (25)

where,
indexes are,
  t is index of dispatch interval, and
  k is index of generators,
input parameters are,
  $C_t^p$ is the battery offer for charging at interval t in $/MWh,
  $C_t^g$ is the battery offer for discharging at interval t in $/MWh,
  $D_t$ is net load at interval t in MW,
  $s_0$ is initial state of charge in MWh,
  $\alpha, \beta$ is storage round trip efficiency,
  $\underline{g}, \overline{p}$ is maximum limit for discharging and charging, in MW, and
  $\underline{s}, \overline{s}$ is minimum and maximum state of charge limit, in MWh, decision variables for time t are,
  $g_{k,t}$ is cleared energy on generator k,
  $g_t$ is cleared discharging energy MW on battery,
  $p_t$ is cleared charging energy MW on battery, $u_t$ is binary variable on battery charging and discharging, and $s_t$ is battery state of charge in MWh, and functions are, $F_k(\bullet)$ is constraints specifying feasible region of generator k, and $C_k(\bullet)$ is cost function of generator k.

2. The method of claim 1, wherein the SOC formulation comprises a warm start.

3. The method of claim 1, wherein applying the SOC formulation comprises adding one binary variable $u_t$ for each battery to a battery storage model, wherein the battery storage model comprises a charging mode, the battery storage model comprises a discharging mode, and the charging mode and the discharging mode are mutually exclusive.

4. A system for incorporating battery storage into a day ahead energy market clearing case, the system comprising:

memory for storing computer instructions; and one or more processors coupled with the memory, wherein the one or more processors, responsive to executing the computer instructions, performs operations comprising:

incorporating battery storage in a day ahead market clearing case; and applying an enhanced state of charge (SOC) formulation to a representation of battery storage in the day ahead market clearing case, wherein the SOC formulation utilizes a tightened battery storage model as follows:

UCED_BIN_$T$=Min $\Sigma_{t=1}^T[-C_t^p p_t + C_t^g g_t] + C_k(x_k, y_k)$ s.t. (1) (2) (3) (5), (15)-(18), (24) (25)

where, indexes are, t is index of dispatch interval, and k is index of generators, input parameters are, $C_t^p$ is the battery offer for charging at interval t in $/MWh, $C_t^g$ is the battery offer for discharging at interval t in $/MWh, $D_t$ is net load at interval t in MW, $s_0$ is initial state of charge in MWh, $\alpha, \beta$ is storage round trip efficiency, $\underline{g}, \overline{p}$ is maximum limit for discharging and charging, in MW, and $\underline{s}, \overline{s}$ is minimum and maximum state of charge limit, in MWh, decision variables for time t are, $g_{k,t}$ is cleared energy on generator k, $g_t$ is cleared discharging energy MW on battery, $p_t$ is cleared charging energy MW on battery, $u_t$ is binary variable on battery charging and discharging, and $s_t$ is battery state of charge in MWh, and functions are, $F_k(\bullet)$ is constraints specifying feasible region of generator k, and $C_k(\bullet)$ is cost function of generator k.

5. The system of claim 4, wherein the SOC formulation comprises a warm start.

6. The system of claim 4, wherein applying the SOC formulation comprises adding one binary variable $u_t$ for each battery to a battery storage model, wherein the battery storage model comprises a charging mode, the battery storage model comprises a discharging mode, and the charging mode and the discharging mode are mutually exclusive.

7. A non-transitory computer-readable storage medium comprising:

instructions stored on the non-transitory computer-readable storage medium that, when executed by a processor, causes the processor to:

incorporate battery storage into a day ahead energy market clearing case; and apply an enhanced state of charge (SOC) formulation to a representation of battery storage in the day ahead market clearing case, wherein the SOC formulation utilizes a tightened battery storage model as follows:

UCED_BIN_$T$=Min $\Sigma_{t=1}^T[-C_t^p p_t + C_t^g g_t] + C_k(x_k, y_k)$ s.t. (1) (2) (3) (5), (15)-(18), (24) (25)

where, indexes are, t is index of dispatch interval, and k is index of generators, input parameters are, $C_t^p$ is the battery offer for charging at interval t in $/MWh, $C_t^g$ is the battery offer for discharging at interval t in $/MWh, $D_t$ is net load at interval t in MW, $s_0$ is initial state of charge in MWh, $\alpha, \beta$ is storage round trip efficiency, $\underline{g}, \overline{p}$ is maximum limit for discharging and charging, in MW, and $\underline{s}, \overline{s}$ is minimum and maximum state of charge limit, in MWh, decision variables for time t are, $g_{k,t}$ is cleared energy on generator k, $g_t$ is cleared discharging energy MW on battery, $p_t$ is cleared charging energy MW on battery, $u_t$ is binary variable on battery charging and discharging, and $s_t$ is battery state of charge in MWh, and functions are, $F_k(\bullet)$ is constraints specifying feasible region of generator k, and $C_k(\bullet)$ is cost function of generator k.

8. The non-transitory computer readable storage medium of claim 7, wherein the SOC formulation comprises a warm start.

9. The method of claim 1, wherein UCED_BIN_T is improved using lazy constraints (UCED_BIN_T_Lazy3).

10. The method of claim 1, wherein UCED_BIN_T is improved using a call back technique (UCED_BIN_T_CB).

11. The system of claim 4, wherein UCED_BIN_T is improved using lazy constraints (UCED_BIN_T_Lazy3).

12. The system of claim 4, wherein UCED_BIN_T is improved using a call back technique (UCED_BIN_T_CB).

13. The non-transitory computer readable storage medium of claim 7, wherein UCED_BIN_T is improved using lazy constraints (UCED_BIN_T_Lazy3).

14. The non-transitory computer readable storage medium of claim 7, wherein UCED_BIN_T is improved using a call back technique (UCED_BIN_T_CB).

* * * * *